US012664155B1

(12) United States Patent
Banerjee et al.

(10) Patent No.: US 12,664,155 B1
(45) Date of Patent: Jun. 23, 2026

(54) EVENT-TRIGGERED QUESTION GENERATION FOR MULTI-MODAL CONTENT RETRIEVAL

(71) Applicant: Amazon Technologies, Inc., Seattle, WA (US)

(72) Inventors: Pratyay Banerjee, San Jose, CA (US); Ankit Chadha, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/901,707

(22) Filed: Sep. 30, 2024

(51) Int. Cl.
| | |
|---|---|
| *G06F 16/00* | (2019.01) |
| *G06F 16/22* | (2019.01) |
| *G06F 16/242* | (2019.01) |
| *G06F 16/2455* | (2019.01) |
| *G06F 40/30* | (2020.01) |
| *G06F 40/40* | (2020.01) |

(52) U.S. Cl.
CPC ............ *G06F 16/243* (2019.01); *G06F 16/22* (2019.01); *G06F 16/24565* (2019.01); *G06F 40/30* (2020.01); *G06F 40/40* (2020.01)

(58) Field of Classification Search
CPC ........ G06F 16/134; G06F 16/31; G06F 16/41; G06F 16/61; G06F 16/71; G06F 16/81; G06F 16/901
See application file for complete search history.

(56) References Cited

U.S. PATENT DOCUMENTS

| | | | | |
|---|---|---|---|---|
| 7,209,876 | B2 * | 4/2007 | Miller | G10L 15/22 |
| | | | | 704/E15.04 |
| 8,762,134 | B2 * | 6/2014 | Reiter | G06F 40/169 |
| | | | | 704/9 |
| 9,213,748 | B1 * | 12/2015 | Matias | G06F 16/951 |
| 9,348,817 | B2 * | 5/2016 | Bohra | G06F 40/35 |
| 9,886,953 | B2 * | 2/2018 | Lemay | H04L 51/02 |
| 10,303,798 | B2 * | 5/2019 | Stubley | G06F 16/3329 |
| 10,423,649 | B2 * | 9/2019 | Ko | G06F 40/295 |
| 10,445,745 | B1 * | 10/2019 | Chopra | G06F 16/3344 |
| 10,748,525 | B2 * | 8/2020 | Abuelsaad | G10L 25/90 |
| 10,956,468 | B2 * | 3/2021 | Codella | G06N 5/022 |
| 11,443,117 | B2 * | 9/2022 | Yu | G06F 40/284 |
| 11,847,424 | B1 * | 12/2023 | Harkous | G06N 20/00 |
| 12,182,111 | B1 * | 12/2024 | Tca | G06F 16/243 |
| 12,271,360 | B1 * | 4/2025 | Nguyen | G10L 15/183 |
| 12,443,797 | B1 * | 10/2025 | Desai | G06F 40/295 |
| 2010/0063961 | A1 * | 3/2010 | Guiheneuf | G06F 16/58 |
| | | | | 707/E17.046 |
| 2015/0006143 | A1 * | 1/2015 | Skiba | G06F 40/263 |
| | | | | 704/2 |

(Continued)

*Primary Examiner* — Noosha Arjomandi
(74) *Attorney, Agent, or Firm* — K&L Gates LLP

(57) ABSTRACT

Devices and techniques are generally described for event-triggered multimodal enrichment and question generation in search. First event data may be received from an event stream. A first prompt for a first language model may be generated. The first prompt may include the first event data and a first request to generate at least a first question associated with the first event data. The first language model may generate the first question and a first answer to the first question based at least in part on the first prompt. A first entry for a search index may be generated. The first entry may include the first question as a key value and the first entry may associate the first question with the first answer.

20 Claims, 8 Drawing Sheets

(56) References Cited

U.S. PATENT DOCUMENTS

| | | | |
|---|---|---|---|
| 2015/0193429 A1* | 7/2015 | Bohra | G06F 16/3329 |
| | | | 704/9 |
| 2018/0075145 A1* | 3/2018 | Zhao | G06F 16/90332 |
| 2019/0260694 A1* | 8/2019 | Londhe | G06Q 10/40 |
| 2019/0311068 A1* | 10/2019 | Clay | G06F 16/9566 |
| 2020/0302316 A1* | 9/2020 | Mishra | G06F 40/35 |
| 2022/0230061 A1* | 7/2022 | Singh | G06V 10/761 |
| 2022/0391849 A1* | 12/2022 | O'Connor | G06F 40/56 |
| 2024/0054156 A1* | 2/2024 | Vincent | G10L 15/22 |
| 2024/0095455 A1* | 3/2024 | Sharma | G16H 10/60 |
| 2024/0095460 A1* | 3/2024 | Xu | G06F 40/30 |
| 2024/0126795 A1* | 4/2024 | Zhong | H04L 51/02 |
| 2024/0281472 A1* | 8/2024 | LaRhette | G06F 16/9558 |
| 2024/0353977 A1* | 10/2024 | Grue | G06F 16/58 |
| 2024/0355131 A1* | 10/2024 | Kuppersmith | G06T 1/60 |
| 2024/0427998 A1* | 12/2024 | Wang | G06N 5/04 |
| 2024/0428044 A1* | 12/2024 | Liu | G06N 3/08 |
| 2025/0036866 A1* | 1/2025 | Tunstall-Pedoe | G06F 40/20 |
| 2025/0063239 A1* | 2/2025 | Gustman | H04N 21/8545 |
| 2025/0103592 A1* | 3/2025 | Niu | G06F 40/295 |
| 2025/0139173 A1* | 5/2025 | Prajapati | G06N 5/02 |
| 2025/0232872 A1* | 7/2025 | Natarajan | G16H 20/00 |
| 2025/0307318 A1* | 10/2025 | Wang | G06F 16/90332 |
| 2025/0335715 A1* | 10/2025 | Kumaresan | G06F 16/24522 |
| 2025/0336008 A1* | 10/2025 | Gupta | G06Q 50/02 |

* cited by examiner

RSS Feed: URL https://mynewsupdatefeed.org
Event 1:

```
<item>
<title>
<![CDATA[ [Team A] scores on a nearly IMPOSSIBLE own goal by [Team B] |
2024 [Sports Tournament] ]]>
</title>
<link>https://www.sportwebsite1252125.com/watch/fmc-m0dd2e3jkopzbw4x</link>
<guid>https://www.sportwebsite1252125.com/watch/fmc-m0dd2e3jkopzbw4x</guid>
<category>soccer</category>
<description>
<![CDATA[ [Team A] took a 1-0 lead over [Team B] after a nearly impossible
own goal by [Team B]. ]]>
</description>
<pubDate>Wed, 26 Jun 2024 22:25:06 +0000</pubDate>
<media:content url="https://static-media.sportwebsite1252125.com/fmc/prod/
sports/351263709/n38bo3xs21lawa.jpg" expression="full" type="image/jpg"
width="1167" height="656">
<media:thumbnail url="https://a57.sportwebsite1252125.com/static-
media.fox.com/fmc/prod/sports/351263709/128/72/n38bo3xs21lawa.jpg"
width="128" height="72"/>
<media:description type="html">
<![CDATA[ [Team A] scores on a nearly IMPOSSIBLE own goal by [Team B] |
2024 [Sports Tournament] ]]>
</media:description>
</media:content>
</item>
```

Generated Questions:

```
{ "questions": [ {
"question": "How did [Team A] take the lead against [Team B] in the 2024
[Sports Tournament]?",
"answer":"[Team A] took a 1-0 lead over [Team B] after [Team B] scored a
nearly impossible own goal.",
 "link":"https://www.sportswebsite1252125.com/watch/fmc-m0dd2e3jkopzbw4x",
 "media_link": "https://static-media.fox.com/fmc/prod/sports/351263709/
n38bo3xs21lawa.jpg",
 "updated_at": "Wed, 26 Jun 2024 22:25:06 +0000" },
 { "question": "Describe the unusual event that occurred in the [Team B] vs
[Team A] match during the 2024 [Sports Tournament]?",
 "answer": "In an unusual turn of events, [Team B] conceded a nearly
impossible own goal, giving [Team A] a 1-0 lead in their [Sports
Tournament] match.",
 "link": "https://www.sportswebsite1252125.com/watch/fmc-m0dd2e3jkopzbw4x",
 "media_link": "https://static-media.fox.com/fmc/prod/sports/351263709/
n38bo3xs21lawa.jpg",
 "updated_at": "Wed, 26 Jun 2024 22:25:06 +0000" } ] }
```

FIG. 2

RSS Feed: URL https://mynewsupdatefeed.org

Event 2:

```
<title>
<![CDATA[ [Player name]'s penalty kick finds the net as [Team A] takes a
2-0 lead over [Team B] | 2024 [Sports Tournament] ]]>
</title>
<link>https://www.sportwebsite1252125.com/watch/fmc-6hz6ejga7b3d28jh</
link>
<guid>https://www.sportwebsite1252125.com/watch/fmc-6hz6ejga7b3d28jh</
guid>
<category>soccer</category>
<description>
<![CDATA[ [Player name]'s penalty kick found the back of the net as [Team
A] took a 2-0 lead over [Team B]. ]]>
</description>
<pubDate>Wed, 26 Jun 2024 23:03:16 +0000</pubDate>
<media:content url="https://static-media.sportwebsite1252125.com/fmc/
prod/sports/VX-9483313/6xx127sgsub2vu8r.jpg" expression="full"
type="image/jpg" width="1167" height="656">
<media:thumbnail url="https://a57.fsportwebsite1252125.com/static-
media.fox.com/fmc/prod/sports/VX-9483313/128/72/6xx127sgsub2vu8r.jpg"
width="128" height="72"/>
<media:description type="html">
<![CDATA[ [Player name]'s penalty kick finds the net as [Team A] takes a
2-0 lead over [Team B] | 2024 [Sports Tournament] ]]>
</media:description>
</media:content>
</item>
```

Generated Questions:

```
{ "questions": [ {
"question": "Who scored the second goal for [Team A] against [Team B] in
the 2024 [Sports Tournament]?",
"answer": "[Player name] scored the second goal for [Team A] through a
penalty kick, extending their lead to 2-0 over [Team B].",
"link": "https://www.sportwebsite1252125.com/watch/fmc-6hz6ejga7b3d28jh",
"media_link": "https://static-media.sportwebsite1252125.com/fmc/prod/
sports/VX-9483313/6xx127sgsub2vu8r.jpg",
"updated_at": "Wed, 26 Jun 2024 23:03:16 +0000"},
{ "question": "How did [Team A] extend their lead to 2-0 in their match
against [Team B]?",
"answer": "[Team A] extended their lead to 2-0 through a penalty kick
successfully taken by [Player name].",
"link":"https://www.sportwebsite1252125.com/watch/fmc-6hz6ejga7b3d28jh",
"media_link": "https://static-media.sportwebsite1252125.com/fmc/prod/
sports/VX-9483313/6xx127sgsub2vu8r.jpg",
"updated_at": "Wed, 26 Jun 2024 23:03:16 +0000"} ] }
```

FIG. 3

600

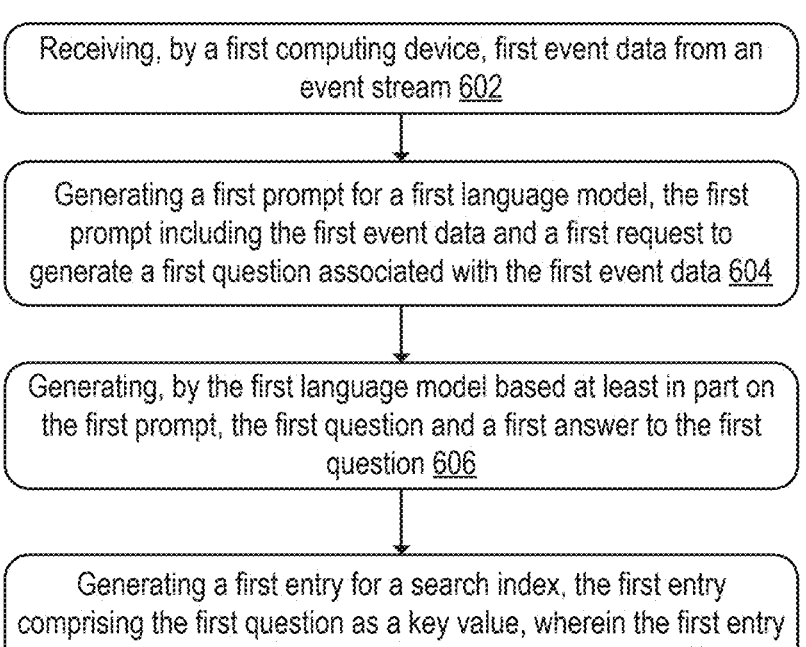

Receiving, by a first computing device, first event data from an event stream 602

Generating a first prompt for a first language model, the first prompt including the first event data and a first request to generate a first question associated with the first event data 604

Generating, by the first language model based at least in part on the first prompt, the first question and a first answer to the first question 606

Generating a first entry for a search index, the first entry comprising the first question as a key value, wherein the first entry associates the first question with the first answer 608

Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute...

828

EVENT-TRIGGERED QUESTION GENERATION FOR MULTI-MODAL CONTENT RETRIEVAL

BACKGROUND

People can interact with computing devices using various input commands. In some systems, one or more input commands may be utilized to execute a search query. A respective computing device may provide search results to the user based on executing the search query, where the search results may or may not be relevant to the user's preferences.

BRIEF DESCRIPTION OF DRAWINGS

FIG. 2 illustrates an example of an event from an event stream and questions generated by the example of FIG. 1, according to various embodiments of the present disclosure.

FIG. 3 depicts a subsequent event from the event stream of FIG. 2, followed by an updated set of questions that may be used in an online search index, in accordance with various aspects of the present disclosure.

FIG. 6 is a flow chart illustrating an example process for event-triggered question generation for use in a search index, in accordance with embodiments of the present disclosure.

DETAILED DESCRIPTION

Figure 1:
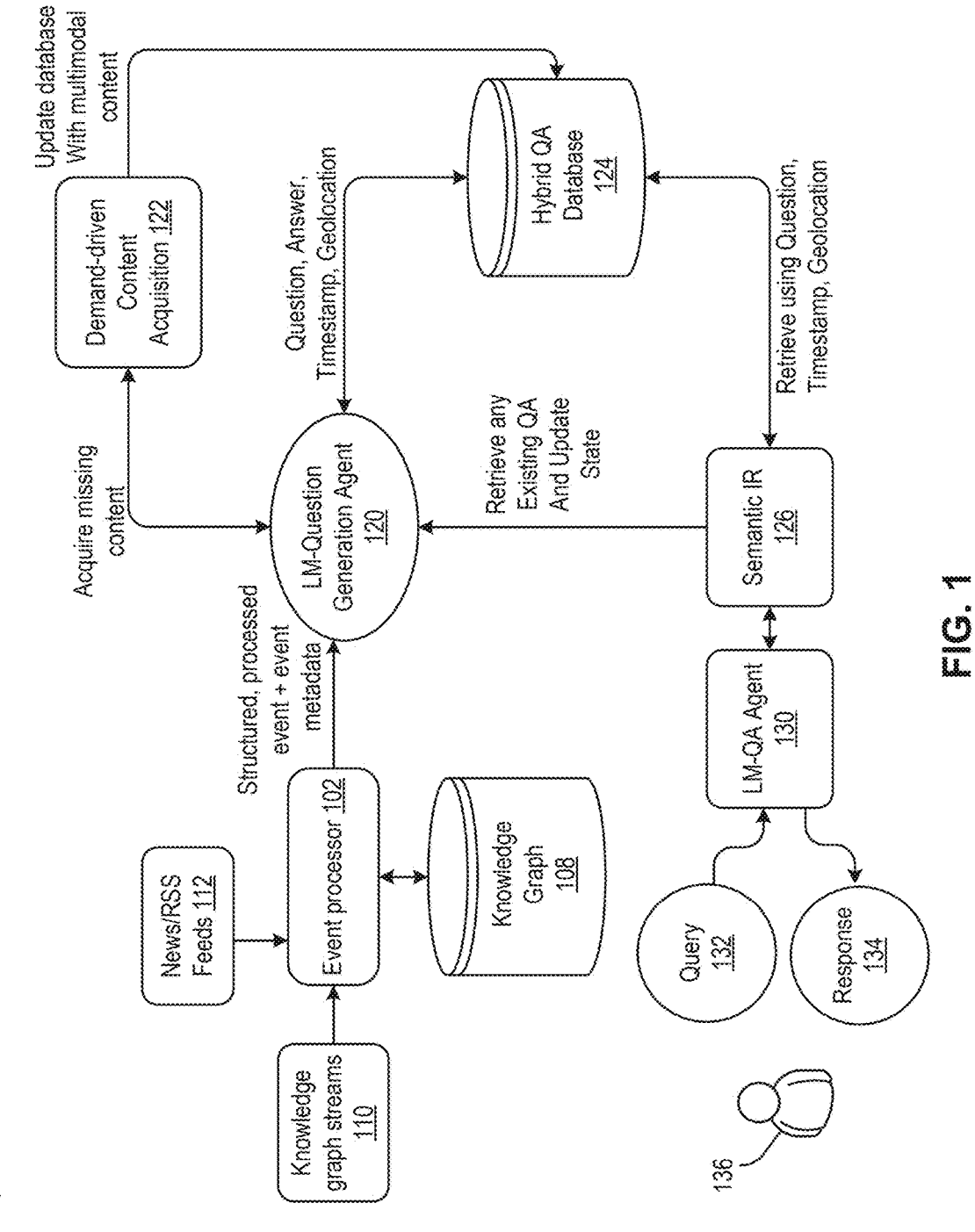
FIG. 1 is a block diagram illustrating an example system for event-triggered question generation and question-based retrieval, in accordance with various aspects of the present disclosure.

In the following description, reference is made to the accompanying drawings that illustrate several examples of the present disclosure. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Devices with integrated processing capabilities are often configured with network communication capability and/or other computing functions allowing the devices to send data to and/or receive data from other devices. In some examples, such devices may include voice-enabled personal assistants and/or other natural language processing interfaces that may be used to control the devices, answer questions, communicate with other people/devices, and/or otherwise interact with the devices and/or other devices. As such devices become more and more prevalent in both the home, office, public spaces, quasi-public spaces (e.g., hotels, offices, retail spaces), and elsewhere generally, and as the technology matures, new services and features are being developed. For instance, in some cases devices may be paired or otherwise grouped together with one another to enable certain functionality. For example, a device that includes voice-based personal assistant functionality may be paired with a device including a display so that spoken commands may be used to control content output by the display device. In another example, content may be transferred from one device to another device in response to user requests and/or other triggering events (e.g., If This Then That (IFTTT) recipes, presence information, etc.).

Some natural language processing flows may employ one or more language models (LMs) in order to process natural language requests. An LM is an artificial intelligence (AI) model that may be capable of processing and generating human-like text based on the latent information it has learned from vast amounts of training data. LMs include "large language models" where the term "large" refers to the size of these models in terms of the number of parameters or weights, which are the values that the model learns during training to make predictions and generate text. LMs may have millions, billions (or even more) parameters, which enable such models to capture complex patterns and nuances in language that, in turn, allow the models to understand and generate more natural-sounding text (relative to previous approaches). Some examples of LMs include the generative pre-trained transformer models (e.g., GPT-3, GPT-4), BERT (bidirectional encoder representations from Transformers), Claude 3.5, large language model Meta AI (LLaMA) 2, etc.

In a generative context, a conventional LM may generate text that is responsive to the input prompt provided to the LM. Conventional LMs excel at generating natural sounding text that appears as though it has been generated by a native speaker in the relevant language. In addition to fluency, generative LMs are able to generate detailed, relevant, and largely accurate responses to input prompts in many cases due to the large amount of latent information the generative LM has learned during training. However, in some cases, a conventional LM may lack the ability to reason or take various actions and, furthermore, may have limited memory.

In the same field of technology, AI-based LM agents may be developed that improve upon the functionality of conventional LMs while also being personalized for a particular user. For instance, in some cases, an LM agent may be configured to remember past user interactions (e.g., conversations, search queries, commands) with a particular user and use said past user interactions to inform future user interactions. While conventional LMs may be configured to utilize external software tools and execute multi-step plans in order to accomplish a desired task (e.g., solve mathematical problems, generate text based on creative writing prompts), conventional LMs may have limited capacity for generating responses based on various user preferences.

In some cases, an LM agent may be integrated with an LM that has been pre-trained on massive datasets that include a wide variety of text from various sources, enabling the LM to understand grammar, context, and the relationships between words and sentences. An LM agent may be configured to access tailored datasets associated with a particular user and/or enterprise such that an LM agent has a particular knowledge base. Similarly, as will be described herein, an LM agent may be configured to consider current events and/or trending data on both local and global levels such that any model output (e.g., multimodal search results) generated by the LM agent may be relevant to the user's specific contextual situation.

Additionally, an LM agent may be configured to integrate with various interfaces which enable the LM agent to interact with external services and/or datastores. For example, an LM agent may be configured to determine an appropriate application programming interface (API) to use to satisfy a particular user request and execute a relevant API call. Furthermore, an LM agent may enhance the capabilities of a conventional LM by being configured to execute various program code and/or data analysis. Further still, an LM agent may be configured to implement various reasoning techniques to solve complex problems, among which may include the generation of an actionable plan comprised of various sub-tasks, steps, operations, and/or the like.

In many conventional online search systems (e.g., information retrieval systems), temporal relevance is used after retrieving search results determined to be most relevant to an input query to re-rank the retrieved results (to bias the output results toward recency or other temporal relevance). Put another way, during online search, temporal information is used as an additional feature to disambiguate between retrieved relevant results for hybrid search indexes (e.g., search indexes using a combination of lexical indexes and semantic indexes).

For many current events and frequently-updated information sources, the traditional search paradigms described above which use temporal information as a ranking feature may result in highly-relevant, but often stale, search results. For example, a user query may be related to what a particular political candidate has said during a political campaign on a particular topic. Traditional online search technologies may retrieve information that may be highly relevant to what the political candidate has said on the topic, but the retrieved information may not be the most recent information. In some cases, this can provide sub-optimal online search results. For example, a user query may be "What did [Candidate name] say about funding for [Government program]?" The most relevant search result may be from several months prior. The returned result may be deemed most relevant, for example, because the result includes a very similar phrasing of the subject matter as was used in the search query. However, the political candidate may have changed positions on funding the government program in a recent speech. Accordingly, the returned search result may be stale information that may result in a poor user experience.

The various event-triggered question generation and question-based retrieval systems and techniques described herein may generate hybrid search indexes that return search results that are not only semantically relevant and/or responsive to the input query, but which are temporally relevant—thereby avoiding issues with returning stale information.

Traditional search technologies index raw information (I) and query this information using natural language questions (Q) (e.g., input search queries). Current index generation methods such as Lexical Indices (Bm25) use a reverse index that indexes words/phrases/lemmas extracted from a document and searches the index using the input query. Similarly, dense indexes (e.g., Dense Embedding and KNN-based indexes) that use semantic search embed raw information (e.g., images, captions, text), but not queries in the same feature space. For online search (e.g., web-based information retrieval), embedding generation for input queries attempts to map the queries to a similar representation space as the information in the dense indexes, but not all queries are covered and the match is typically imperfect. Search strategies such as Reverse Index, Dictionary Tree-Index, Range Search-Index, and/or Dense Embeddings exhibit best performance (e.g., in terms of search hits and latency) if the Index-Keys align with the expected search query key. However, there is no guarantee that a wide variety of search query keys will be aligned with the Index-keys. Accordingly, there is a mismatch between search indexes and query keys in conventional search indexes and paradigms that leads to suboptimal online search experiences (with less relevant and/or less temporally relevant results being returned for at least some input queries).

The various event-triggered question generation and question-based retrieval systems and techniques described herein are able to overcome the aforementioned technical issues by ingesting an event stream of structured and unstructured data (from any desired sources, such as websites, news feeds, Really Simple Syndication (RSS) feeds, knowledge graph feeds, event-driven asynchronous messaging architectures, etc.) and using an LM to generate a set of questions that can be answered for each event. In addition, the LM may generate (for a given event and a generated question) an answer for the question (using the event information). Generated answers may be multi-modal with content fragments that include text, images, videos, audio, etc. A generated question may be stored as a key in a hybrid search index, together with the generated answer for the question. Additionally, temporal information (e.g., when did the event take place) and/or geolocation data (to what location(s) does the event pertain) may be stored in association with the generated answer. In this way, a robust set of questions may be stored as keys within the search index ensuring alignment between input queries (which are themselves questions) and the keys of the index. Further, the search index may be updated in near real time as additional events are received from the event stream. These events may be used to generate further questions, answers, temporal information, and/or geolocation information so that the search index is continually updated with new information and new questions that can be used as keys.

In addition, many events (e.g., RSS feed events, website events, published messages using an asynchronous API, etc.) may include multimodal information (e.g., images, videos, etc.). In many cases, it may be useful to aggregate and/or combine such information in response to a user query (e.g., along with text answering to the user's question and/or other information relevant to the user's input query). Accordingly, when the LM-question generation agent described herein generates one or more questions and one or more corresponding answers, the LM-question generation agent may attempt to include multi-modal content in the answers. If the event itself provides multimodal content that can be used (e.g., images that are permissible for use) these images may be stored in the hybrid search index in association with the generated question. However, in some cases, the received event may either not include multimodal content (e.g., a text-only event) or may not include any multimodal content that is permissible for use (e.g., due to copyright restrictions). In such examples, semantic information retrieval may be used to attempt to retrieve semantically relevant multimodal content from available sources (e.g., databases with licensed multimodal content, prior relevant events, etc.). Retrieved multimodal content (and/or references thereto (e.g., a hyperlink, pointer data, etc.) may be merged with other retrieved fragments (e.g., a text-based answer generated for the event, an audio file related to the event, etc.) and stored in the hybrid index, as described in further detail below. Accordingly, if an input query is received that is matched with the question generated for the event, multimodal content may be merged with the answer and provided in response to the query. In the event that novel or rare entities are observed in the event (e.g., an article about a new movie that is currently not represented in the hybrid index and which has no multimodal content), a missing content event may be generated and queued to a demand driven content acquisition service. When relevant multimodal content to the entity is available, the multimodal content (and/or a reference thereto) may be stored in the hybrid index so that it may be included in response to future queries.

In various examples, LMs, such as the LM-Question generation agent and/or the LM-QA Agent described herein, may be typically trained on massive datasets that include a wide variety of text from various sources, enabling the LMs to understand grammar, context, and the relationships between words and sentences. In various examples described herein, a natural language processing flow may employ an LM to process a natural language request. In some examples, an LM-based natural language processing flow may generate a prompt from automatic speech recognition (ASR) output data representing a spoken user utterance. The prompt may be fed into the LM. In other examples, a text input (e.g., text typed on a keyboard) may be used as an input prompt (or may be used to generate an input prompt) to the LM. The LM may be trained to output a text-based action plan which may be formatted into a series of computer-executable actions (including application programming interface (API) calls to various subsystems) that may be taken to process the natural language request. In various examples, an LM-based processing flow may be a recursive process wherein the initial action plan may be executed (e.g., by making various API calls to API providers to receive results/responses), and the responses may be used to generate updated LM prompts which may then be input into the LLM for generation of an updated action plan.

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Bard assistant or the Google Assistant system from Google LLC of Mountain View, California, Dragon speech recognition software or the Copilot system from Microsoft of Redmond, Washington, the Alexa system from Amazon.com, Inc. of Seattle, Washington, etc. Other examples of smart home devices and/or systems that may use the various event-based multimodal information retrieval techniques described herein may include Google Nest Smarthome products from Google LLC, HomeKit devices from Apple Inc., various smart doorbells (e.g., with integrated cameras and/or natural language processing capability), etc. For example, some models of Ring camera-integrated doorbells include Alexa speech processing functionality to allow users to have a virtual assistant interact with people at the door to take messages, etc.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device identifier data, device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the various event data and/or multimodal content described herein may be used only in accordance with the appropriate permissions, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a keyword and/or phrase, which are collectively sometimes referred to herein as a "wakeword", is detected in the audio data. In some examples, when a wakeword is detected, the speech processing enabled device may enter a "sending mode," "audio capturing mode," and/or other type of processing mode in which audio detected by the microphones following the wakeword (e.g., data representing user request data spoken after the wakeword) may be sent to natural language processing computing component(s) (either locally or remotely) for further natural language processing (e.g., ASR, natural language understanding (NLU), LLM inference, etc.). In various examples, the wakeword detection component may be used to distinguish between audio that is intended for the natural language processing system and audio that is not intended for the natural language processing system.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models are machine learning models that include an encoder network and a decoder network. LMs are often implemented using transformer models. The encoder takes an input (e.g., a "prompt") and generates feature representations (e.g., feature vectors, feature maps, etc.) of the input. The feature representation is then fed into a decoder that may generate an output based on the encodings. In natural language processing, transformer models take sequences of words as input. A transformer may receive a sentence and/or a paragraph (or any other quantum of text) comprising a sequence of words as an input.

The encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. Each encoder layer passes its token output to the next encoder layer. The decoder network takes the tokens output by the encoder network and processes them using the encoded contextual information to generate an output (e.g., the aforementioned one-dimensional vector of tokens). The output data may be used to perform task-specific functions (e.g., action plan generation for an LLM-based natural language processing flow, etc.). To encode contextual information from other inputs (e.g., combined feature representation), each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scale Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight $a_{ij}$ from token is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention } (Q, K, V) = softmax\left(\frac{QK^T}{\sqrt{d_k}}\right)V$$

Multi-Head Attention

One set of ($W_Q$, $W_K$, $W_V$) matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data. In various examples described herein, the position embedding may describe an order of a sequence of words.

Each decoder layer comprises three components: a self-attention mechanism (e.g., scaled dot product attention), an attention mechanism over the encodings, and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

FIG. 1 is a block diagram illustrating an example system 100 for event-triggered question generation and question-based retrieval, in accordance with various aspects of the present disclosure. The various components of the system 100 for event-triggered question generation and question-based retrieval may be implemented using any number of computing devices and/or virtualized compute services, whether distributed or non-distributed, as desired. In various examples, the computing devices and/or services may communicate with one another over a computer communication network, such as a wide area network (WAN) (including the Internet), a local area network (LAN), and/or some combination thereof. Computer-executable instructions effective to implement the various systems and techniques described herein may be stored in non-transitory computer-readable memory that is included in and/or accessible by the various components of the system 100.

An event processor 102 may be a compute service that subscribes to one or more event streams, including news/RSS feeds 112 and/or knowledge graph streams 110. An event-driven asynchronous messaging protocol (e.g., Apache Kafka, Apache Pulsar, Google Cloud Pub/Sub, Amazon SNS, RabbitMQ, etc.) may be used to subscribe to one or more event feeds. Events may be published in real time and received by the event processor 102. In the context of online event streams, received event data can be categorized as either structured data or unstructured data.

Structured data is highly organized data that is typically easily searchable. Structured data is often stored in databases and can be readily analyzed using existing data tools. For example, RSS feeds may include data organized into various searchable fields. For example, an RSS feed from a news website might include structured data such as:

Title: Breaking News: Market Hits Record High
Description: "The stock market reached an all-time high today, driven by tech stocks."
Publication Date: "2024-07-16"
Author: "John Doe"
URL: "https://123newswebsite456.com/article/12345"

An example of structured data from a knowledge graph stream may include data about a particular entity in the knowledge graph. For example:

Entity: "Barack Obama"
Type: "Person"
Birthdate: "1961-08-04"
Occupation: "Politician"
Relationships: {"Spouse": "Michelle Obama" }

Unstructured data, on the other hand, typically lacks a predefined format or organization. Examples of unstructured data may include the full text of a news article, the text and/or embedded multimodal content associated with a website update, full text articles related to entities in a knowledge graph, etc. Some event streams may include a mix of structured and unstructured data.

Upon receipt of event data by event processor 102 (e.g., as part of event streams subscribed to by the event processor 102), the event processor 102 may generate a structured data representation of the event (e.g., according to a predefined format). In various examples, the event processor 102 may include an encoder that may be used to generate high-dimensional vector embeddings representing a received event. In other examples, the event processor may parse a given event to determine values for various fields (e.g., event data and/or metadata) of a predefined structured data format, so that received events from event streams may be represented in a more uniform manner with respect to one another.

In various examples, the event processor 102 may query knowledge graph 108 in order to determine additional contextual information about the event to generate the structured, processed event and/or event metadata that represents the event in a predefined manner (e.g., in an event template). For example, if the event is related to one or more entities (e.g., persons, institutions, real-world events, places, etc.), the knowledge graph 108 may be queried by the event processor 102 to obtain additional contextual information about those entities (e.g., used to provide additional context and/or to disambiguate between similarly-named entities). This additional information may be incorporated into the structured, processed event data, and event metadata that is sent to the LM-Question Generation Agent 120.

In various examples, the LM-Question Generation Agent 120 may be a pre-trained language model agent fine-tuned on such predefined event templates. However, in other examples, the LM-Question Generation Agent 120 may ingest raw event data and/or processed event data that does not necessarily conform to a particular predefined template. The LM-Question Generation Agent 120 is prompted (using prompt data) to generate relevant questions for the input event data (E_new) from the information I (in E_new) at time T. Additionally, the LM-Question Generation Agent 120 may use retrieval augmented generation (RAG) to retrieve similar old events (E_old), associated questions for the old events (Q_old), and answers to those associated questions (A_old) during question generation. Accordingly, during question generation, LM-Question Generation Agent 120 may retrieve triple data (E_old, Q_old, A_old) for past event data that is similar to the current event. In various examples, embedding-based retrieval may be used to retrieve the triple data. In other examples, lexical search may be used to retrieve the triple data. In still other cases, a combination of lexical search and/or embedding-based retrieval may be used to retrieve the triple data. The triple data may be retrieved from hybrid QA database 124 and/or any other available data structure storing such information.

The triple data may be used as additional context by LM-Question Generation Agent 120 during question generation for the new event E_new so that LM-Question Generation Agent 120 can generate similar, but novel, questions related to the new event, E_new. For complex question generations, the event E_new (as input into the LM-Question Generation Agent 120) may be augmented with similar generated questions (event chain or clusters on unique event IDs or point of interest entity IDs) from the knowledge graph 108 and/or the hybrid QA database 124.

For a given event E_new, the LM-Question Generation Agent 120 may generate a set of one or more questions, Q_new, that can be answered on the basis of the event E_new. For a given generated question Q_new and event E_new, the LM-Question Generation Agent 120 may be prompted to generate new multimodal answer fragments A_new present in the event E_new. A multimodal answer fragment refers to information data, of any modality, that may be a subset of the information of the original source of the fragment (e.g., an embedded image retrieved from a long-form article, a sentence of text from a website, an audio file accompanying an article about a musician, etc.). In general, A_new comprises information that answers the newly-generated question, Q_new, as well as contextual information. For example, if the question Q_new is who is winning the match between the Cats and the Dogs (e.g., referring to a sporting match), A_new may provide answer fragments including the score, images of the respective logos of the teams (Cats and Dogs), and a video of the most recent scoring play. It should be noted that this is merely an example and the particular multimodal answer fragments may depend on the event, available and retrievable information related to the event, and the generated question.

In addition to the generated question data (Q_new) and the generated multimodal answer data (A_new), temporal information T may be generated and/or retained (if already present) and may be associated (e.g., in hybrid QA database 124) with the generated multimodal answer fragment A_new. In the above example, T may be the time remaining in the game, a timestamp associated with the event (e.g., month-day-year, time), etc. Similarly, geolocation data may also be retained and associated with the generated multi-modal answer fragment A_new. Geolocation data may describe a location or locations associated with the event E_new.

In various examples, LM-Question Generation Agent 120 may determine that an event E_new does not provide multimodal content (e.g., there are no relevant images, videos, audio files, etc., associated with a text-only event). LM-Question Generation Agent 120 may attempt to perform multimodal information retrieval (e.g., semantic information retrieval using WebIR, MMIR, SIR) on existing available data sources, prior relevant events, etc. LM-Question Generation Agent 120 may merge any relevant multimodal enrichments into A_new for the generated questions Q_new. To continue the foregoing example, the event may report current information about an on-going sports match between a team called the Cats and a team called the Dogs. The event data may be text only. LM-Question Generation Agent 120 may determine that a prior event E_old, is associated with the same game (using semantic information retrieval and/or the timestamp T associated with the current event). The event E_old may include one or more images (e.g., team logos, an image from the game, etc.) and/or other multi-modal content. LM-Question Generation Agent 120 may store such images (and/or references to such images) in A_new (e.g., using an upsert operation on the entry in the hybrid QA database 124) in order to enrich the information Q_new, A_new, T in the hybrid QA database 124.

In some examples, LM-Question Generation Agent 120 may determine for a given event E_new which does not provide multimodal content that no multimodal content related to the event E_new is currently available. For example, the event E_new may describe a novel or rare entity for which no images or other multimodal content is available. In another example, there may be no licensed content (e.g., content for which all permissions have been acquired for use) available for E_new. In such examples, LM-Question Generation Agent 120 may generate a missing content event that may identify the event E_new and/or an entity described in the event E_new for which no multi-modal content is available and may queue the missing content event in the demand-driven content acquisition component 122. The demand-driven content acquisition component 122 may store the queue of missing content events and may attempt to acquire multimodal content for each missing content event (e.g., by searching publicly available data sources and/or by attempting to obtain the necessary rights/licenses to use particular instances of mul-timodal content). When demand-driven content acquisition component 122 acquires permissible content related to one of the missing content events, A_new in the index (e.g., hybrid QA database 124) may be updated to the multimodal content (or a reference thereto) and demand-drive content acquisition component 122 may clear the missing content event from the queue.

LM-Question Generation Agent 120 may index generated Q_new, A_new, T (and/or geolocation data) in the hybrid QA database 124 using Q_new as the key. If the question Q_new matches an existing question (i.e., Q_old=Q_new), with an older timestamp (i.e., T_old<T_new) the index may be updated with the newer answer A_new and new time-stamp T_new. The list of previous answers (e.g., A_old) may be retained together with their corresponding timestamps. Accordingly, a trail of updated multimodal information is retained for questions. As such, the hybrid QA database 124 persists an on-going trail of changing information related to an on-going question or concern (e.g., the various remarks and/or changing positions that a public figure makes on a particular topic over time, the changing events of a sports match, key events related to an on-going newsworthy event, etc.).

Given an input query 132 (e.g., from user 136), LM-QA Agent 130 may use semantic information retrieval 126 to retrieve the top-K questions from the hybrid QA database 124. For example, if semantic retrieval is used, semantic information retrieval 126 may use an encoder to embed the query 132. The resulting embedding may be used to search the queries (e.g., Q_new) stored in the hybrid QA database 124 as key values. The top-K questions, answers, temporal data (and/or geolocation data) stored in the hybrid QA database 124 may be retrieved. The provided response 134 may include the most recent (temporally) multimodal answers for the query 132. Additionally, since the query 132 is matched to the question keys stored in hybrid QA database 124, the retrieval operations is well-aligned and provides multi-modal information that is highly relevant (semanti-cally and temporally) to the user's input query.

Figure 8:
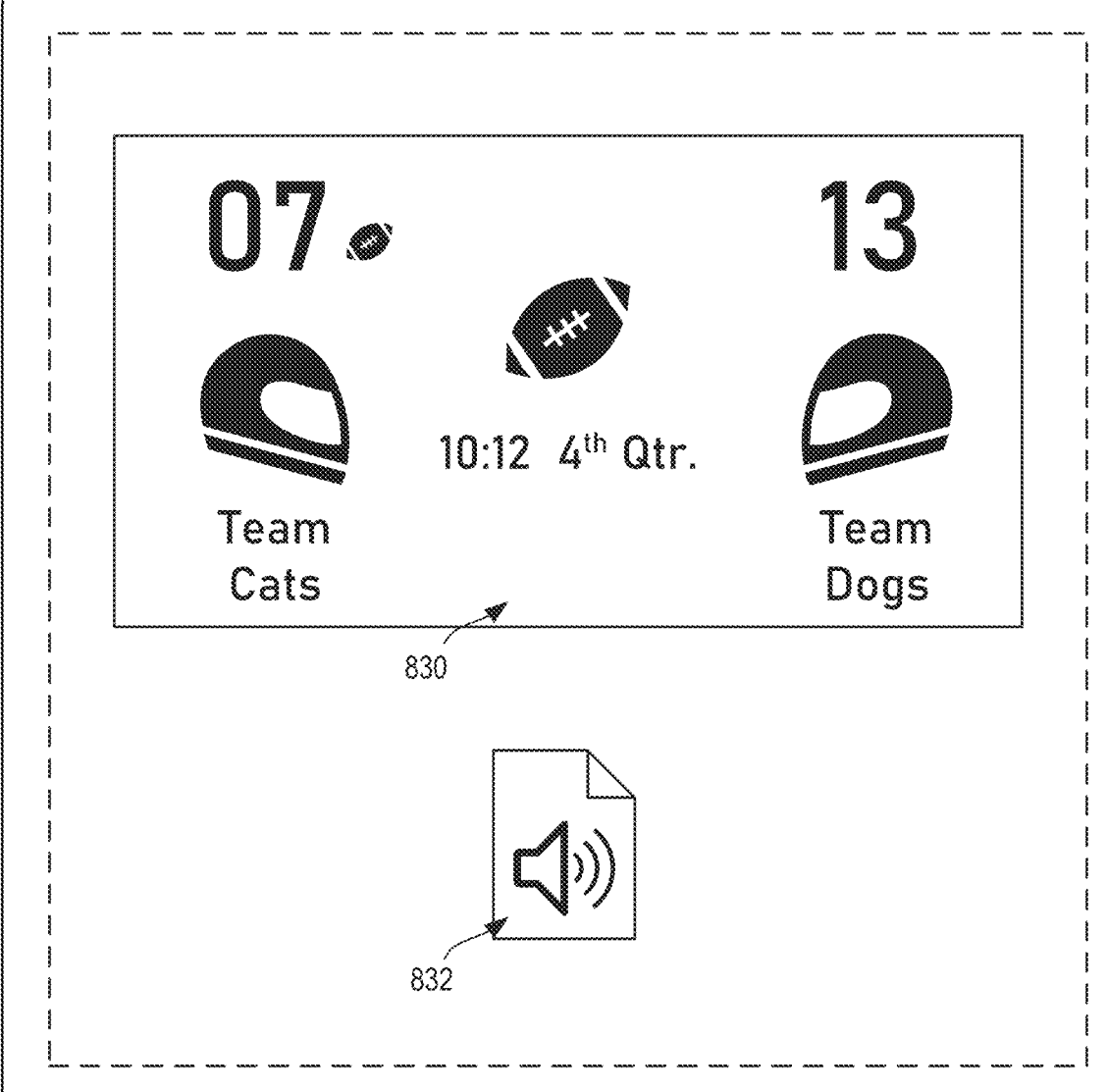
FIG. 8 depicts an example of multi-modal content that may be retrieved using the system for event-triggered question generation and question-based retrieval of FIG. 1, in accordance with various aspects of the present disclosure.

In various examples, users (e.g., user 136) may subscribe to a particular question that they are interested in (e.g., through LM-QA agent 130 and/or event processor 102). For example, event processor 102 may store the question in memory in association with an account and/or identifier for the user 136. LM-Question Generation Agent 120 may generate a question for the newly-received event that matches the user-subscribed question. In some other examples, event processor 102 may determine that an event matches a prior event for which a user has a subscribed question. In either case, the LM-Question Generation Agent 120 may generate an answer (e.g., a multimodal answer as shown in FIG. 8) for the newly-received event. The hybrid QA database 124 may be updated with the new timestamp and/or new answer data (for the existing question) and the user 136 may be sent a push notification with the new answer. Any of LM-Question Generation Agent 120, LM- QA Agent 130, and/or event processor 102 may send the push notification comprising the new answer to the subscribing user 136.

FIG. 2 illustrates an example of an event from an event stream and questions generated by the example of FIG. 1, according to various embodiments of the present disclosure. In the example of FIG. 2, an event—Event 1—is received from an RSS feed (with the example URL https://mynews-updatefeed.org). Event 1 comprises structured data comprising a news update about a soccer match where Team A scores on an own goal by Team B. Event 1 includes text information about the event from a website (including links to the website), a description of the event, a timestamp (e.g., <pubDate>), references (e.g., hyperlinks) to multimodal content (including a thumbnail, a .jpg image, etc.).

As described in reference to FIG. 1, event processor 102 may parse and process the event into a predefined format. In some other examples, structured data (or unstructured data) may not be processed into a predefined format and instead may be input directly into the LM-Question Generation Agent 120. The LM-Question Generation Agent 120 may retrieve similar past events (including their questions, answers, and/or multimedia content). This contextual data may inform the LM-Question Generation Agent 120 how to generate questions and/or answers for the Event 1. The LM-Question Generation Agent 120 may be prompted to generate a series of questions (e.g., "Generated Questions" in FIG. 2) that may be answered using Event 1. Additionally, as shown, the LM-Question Generation Agent 120 may generate answers to the generated questions. For example, LM-Question Generation Agent 120 generates the question "How did [Team A] take the lead against [Team B] in the 2024 [Sports Tournament]?" along with the answer: "[Team A] took a 1-0 lead over [Team B] after [Team B] scored a nearly impossible own goal." The answer is enhanced with multimodal fragments and a timestamp:

link":"https://www.sportswebsite1252125.com/watch/fmc-m0dd2e3jkopzbw4x", "media_link": "https://static-media.fox.com/fmc/prod/sports/351263709/n38bo3xs21lawa.jpg", "updated_at": "Wed, 26 Jun. 2024 22:25:06+0000"}

In this example, the multimodal fragments are included in the event itself (e.g., in Event 1). However, in other examples, the LM-Question Generation Agent 120 may retrieve multimodal content from available data stores (e.g., knowledge graph 108, hybrid QA database 124, etc.). As shown in FIG. 2, the LM-Question Generation Agent 120 may generate a plurality of question-answer pairs for Event 1. In various examples, these questions may be similar to questions that have been generated for similar past events (as determined using semantic search).

Question/answer/event data may be stored in the hybrid QA database 124 as a new entry with the question serving as the index key. Additionally, the timestamp may be stored. If a question matches a previous question, the index entry may be updated with the most recent event data (e.g., including the answer and the multimodal content) while retaining the older answers and timestamps. In this way, the most recent data may be returned in response to an input search query by matching the input query to a question key in the hybrid QA database 124.

FIG. 3 depicts a subsequent event (Event 2) from the event stream of FIG. 2, followed by an updated set of questions that may be used in an online search index, in accordance with various aspects of the present disclosure. As previously described, an event stream may send a series of events over time (e.g., using an asynchronous event driven messaging architecture). Accordingly, the system 100 for event-triggered question generation and question-based retrieval may update the hybrid QA database 124 over time as additional events are received.

For example, Event 2 may be part of the RSS feed described above in reference to FIG. 2 and may be a subsequent event to Event 1. In the specific example, Event 2 may be a second goal in the soccer match between Team A and Team B (after the goal described in Event 1). Event 2 describes that "[Player name]'s penalty kick finds the net as [Team A] takes a 2-0 lead over [Team B]2024 [Sports Tournament]". Event 2 includes links to websites related to the event (and/or to multimodal content, such as images and/or videos related to Event 2) along with a timestamp, event title, category metadata, etc.

LM-Question Generation Agent 120 may generate the questions shown in FIG. 3 that may be answered using the event data of Event 2. As shown, a first question may be "Who scored the second goal for [Team A] against [Team B] in the 2024 [Sports Tournament]?" LM-Question Generation Agent 120 may generate the answer "[Player name] scored the second goal for [Team A] through a penalty kick, extending their lead to 2-0 over [Team B]." The answer may also include multimodal content such as a link to the video, a link to an image, a link to the website, a timestamp, etc. The generated questions may be used as key values in hybrid QA database 124, as previously described. If one of the generated questions matches an existing question in the index, the entry may be updated with the latest answer data and/or multimodal data (and/or references thereto) and timestamp, while retaining older timestamped information. Accordingly, the hybrid QA database 124 may maintain a temporally updated history related to the event stream.

Figure 4:
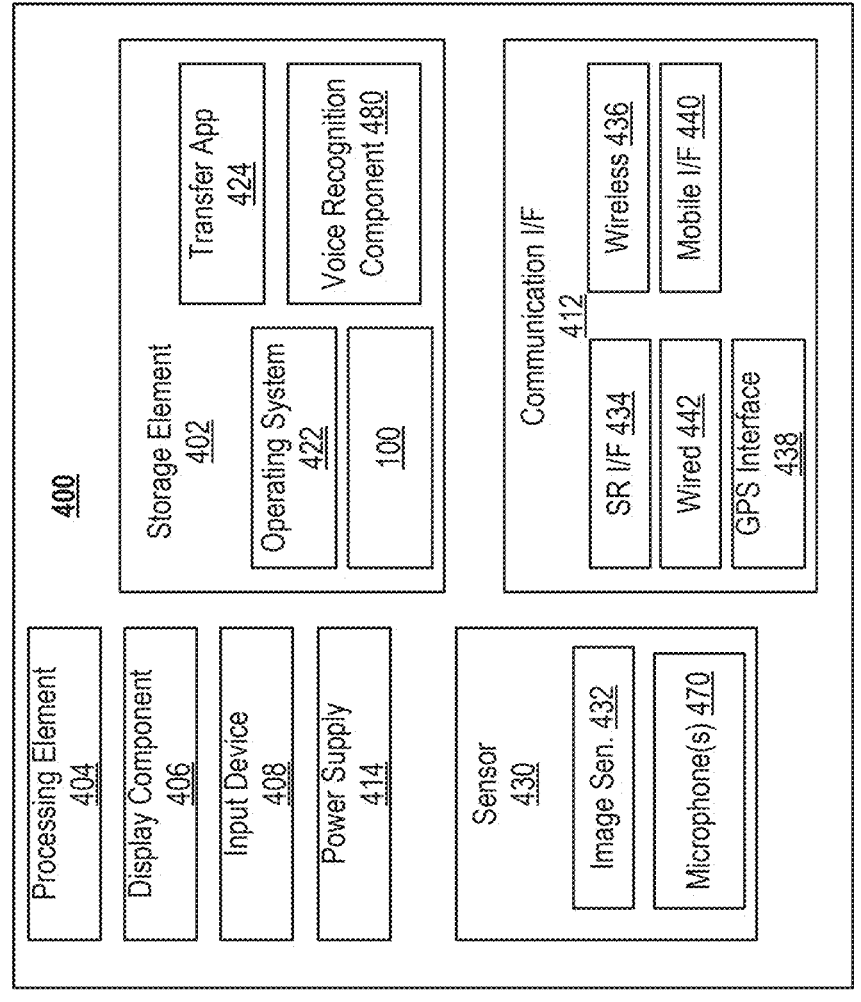
FIG. 4 is a block diagram showing an example architecture of a network-connected device that may be used in accordance with various embodiments described herein.

FIG. 4 is a block diagram showing an example architecture 400 of a network-connected device (e.g., a local network-connected device such as a natural language processing-enabled device or another input device) that may be used to implement, at least in part, a natural language processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise one or more components of the system 100 for event-triggered question generation and question-based retrieval.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
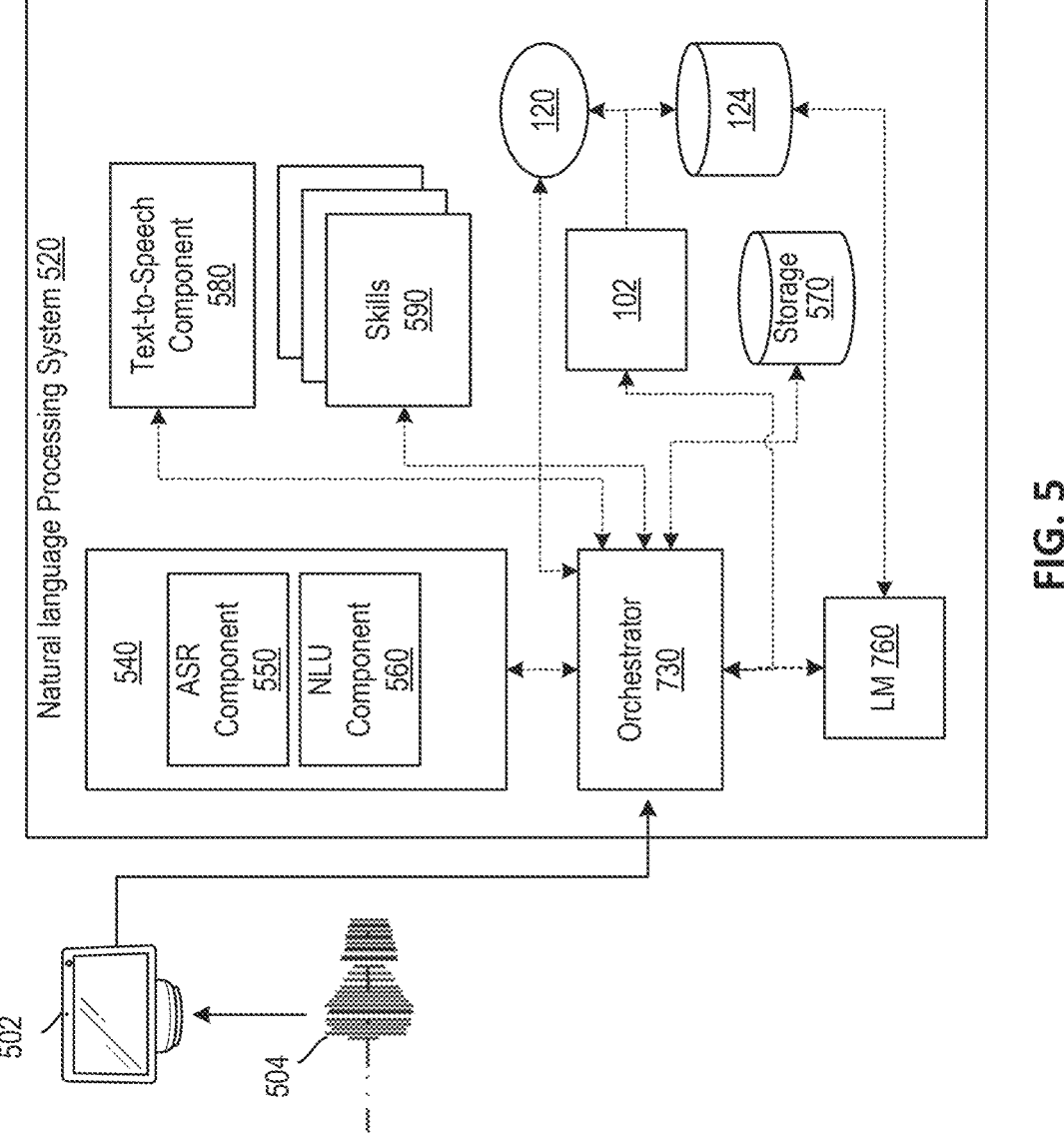
FIG. 5 is a block diagram showing an example architecture of a natural language processing system that may be used in accordance with various embodiments described herein.

FIG. 5 is a block diagram showing an example architecture of a natural language processing system 520 that may be used in accordance with various embodiments described herein. In various examples situations, a natural language processing device 502 (e.g., a speech processing-enabled device such as a device including the architecture 400) may receive audio data 504 and may send the audio data 504 to the natural language processing system 520 for processing. As described above, the device 502 may capture audio using the microphone 470, and send audio data 504 (e.g., representing a spoken user request), corresponding to the captured audio, to the natural language processing system 520. The device 502 may include a wakeword detection component that detects when input audio includes a spoken wakeword, and when the wakeword is detected, the audio data 504 is sent by the device 502 to the natural language processing system 520. The natural language processing system 520 may employ language models (such as LM 760 descried in reference to FIG. 7) and/or other natural language processing components (such as natural language understanding component 560).

Upon receipt by the natural language processing system 220, the audio data 504 may be sent to an orchestrator 730 (e.g., a language model orchestrator). The orchestrator 730 may include memory and logic that enables the orchestrator 730 to send various pieces and forms of data to various components of the system.

The orchestrator 730 may send the audio data 504 to a natural language processing component 540. An ASR component 550 of the natural language processing component 540 transcribes the audio data 504 into one or more hypotheses representing speech contained in the audio data 504. The natural language processing component 540 interprets the speech in the audio data based on a similarity between the characteristics of the audio data corresponding to the speech and pre-established language models. For example, the natural language processing component 540 may compare the audio data 504 with models for sounds (e.g., subword units such as phonemes) and sequences of sounds to identify words that match the sequence of sounds in the speech represented in the audio data 504. The natural language processing component 540 may send text data generated thereby to an NLU component 560 of the natural language processing component 540. The text data output by the natural language processing component 540 may include a top scoring hypothesis of the speech represented in the audio data 504 or may include an N-best list including a group of hypotheses of the speech represented in the audio data 504, and potentially respective scores ASR processing confidence scores.

The NLU component 560 attempts to make a semantic interpretation of the phrases or statements represented in the text data input therein. That is, the NLU component 560 determines one or more meanings associated with the phrases or statements represented in the text data based on individual words represented in the text data. The NLU component 560 interprets a text string to derive an intent of the user (e.g., an action that the user desires be performed) as well as pertinent pieces of information in the text data that allow a device (e.g., the natural language processing system 520) to complete the intent. For example, if the text data corresponds to "Play the new album by {Musical_Artist}", the NLU component 560 may determine the user intended to invoke a music playback intent to play the identified album.

In various examples, the orchestrator 730 may instead pass the audio data 504 and/or a transcription of the audio data 504 (e.g., generated by ASR component 550) to LM 760 for processing, as described in further detail below in reference to FIG. 7. As shown in reference to FIG. 5, in various examples the natural language processing system 520 may receive streamed event data from the event processor 102. The natural language processing system 520 (and/or orchestrator 730) may send a structured data representation of streamed events to the LM-Question Generation Agent 120. LM-Question Generation Agent 120 may attempt to retrieve similar events (e.g., from hybrid QA database 124) and/or may generate new questions and/or answers and may store newly-generated questions as entries in the hybrid QA database 124. As previously described, generated questions may be stored in the hybrid QA database 124 as index keys.

Upon receiving a user query (e.g., included in audio data 504), the LM 760 (which may be or include, for example, LM-QA Agent 130 described in FIG. 1) may perform a semantic IR 126 to retrieve multi-modal answer data from the hybrid QA database 124 by embedding the query and matching the query embedding to query embeddings stored as key values in the hybrid QA database 124. TTS component 580 may be used to generate audio data representing the retrieved answer text (while a display of device 502 may be used to display images retrieved from hybrid QA database 124).

The natural language processing system 520 may include a non-transitory computer-readable memory storage 570, storing various instructions for operation of the natural language processing system 520. In some examples, the natural language processing system 520 may include one or more skills 590. Skills 590 may be application-specific programs that may be accessible by the orchestrator 730 and/or the LM 760. In various examples, application programming interfaces (APIs) of the skills 590 may be exposed to the orchestrator 730 and/or the LM 760 (along with API definitions) so that the LM 760 and/or the orchestrator 730 is able to understand the specific functionality of a given skill along with the specific arguments and expected responses associated with the skill. The natural language processing system 520 may also include a TTS component 580 that synthesizes speech (e.g., generates audio data) corresponding to text data input therein. The TTS component 580 may perform speech synthesis using one or more different methods. In one method of synthesis called unit selection, the TTS component 580 matches text data against one or more databases of recorded speech. Matching units are selected and concatenated together to form audio data. In another method of synthesis called parametric synthesis, the TTS component 580 varies parameters such as frequency, volume, and noise to create an artificial speech waveform output. Parametric synthesis uses a computerized voice generator, sometimes called a vocoder.

The various components of the natural language processing system 520 and the device 502 described herein may be implemented in software, hardware, firmware, or some combination thereof.

The natural language processing system 520 may reside on device 502, in a cloud computing environment, or some combination thereof. For example, the device 502 may include computing equipment, some portion of which is configured with some or all of the components or functionality of natural language processing system 520 and another portion of which is configured with some or all of the components or functionality of computing device(s) used in natural language processing system 520. The device 502 may then perform a variety of functions on its own (such as when remote communications are unavailable), and/or may communicate (when capable) with computing device(s) and/or or the natural language processing system 220 to perform other functions. Alternatively, all of the functionality may reside on the device 502 or remotely.

FIG. 6 is a flow chart illustrating an example process 600 for event-triggered question generation for use in a search index, in accordance with embodiments of the present disclosure. The process 600 of FIG. 6 may be executed by one or more computing devices. The actions of process 600 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 600 may be described above with reference to elements of FIGS. 1-5. Although shown in a particular order, the steps of process 600 may instead be performed in a different order. Additionally, various steps may be performed in parallel in various implementations. Further, some steps may be omitted and/or other steps may be added in accordance with the event-triggered question generation for multi-modal content retrieval techniques described herein.

Process 600 may begin at action 602, at which a first computing device may receive first event data from an event stream. The event stream may be data received (e.g., via an asynchronous event drive architecture) representing a website update, RSS feed data, a news event, a published message to which a message broker of the first computing device subscribes, etc. The first event data may or may not include multimodal content (or a reference thereto). The first event data may be associated with a timestamp describing a timing of the event (e.g., a timestamp associated with a website update, a news story, etc.).

Processing may continue at action 604, at which a first prompt for a language model may be generated. The first prompt may include the first event data and a first request to generate a first question associated with the first event data. In various examples, the event processor 102 may generate a structured data representation of the first event data. In some examples, the event processor 102 and/or the LM-Question Generation Agent 120 may retrieve similar past events (using semantic search), along with generated questions and/or answers for those past events. The LM-Question Generation Agent 120 may use such data as context when generating questions for the new event (e.g., the first event data from action 602). The first event data may also be input into the LM-Question Generation Agent 120 to generate the questions and/or answers.

Processing may continue at action 606, at which the first language model may generate the first question and a first answer to the first question based at least in part on the first prompt. The first question may be a question that can be answered based on the first event data. The LM-Question Generation Agent 120 may parse the first event data to determine one or more questions that can be answered using the first event data and which may be asked given the first event data. In addition, the LM-Question Generation Agent 120 may generate answers to these questions (e.g., using the first event data). In various examples, the LM-Question Generation Agent 120 may determine whether multimodal content (such as images, video) related to entities in the first event data are either included in the first event data or are available in accessible data sources. If no multimodal content is available, the LM-Question Generation Agent 120 may queue a missing content event using the demand-driven content acquisition component 122 (as previously described).

Processing may continue at action 608, at which a first entry for a search index may be generated. The first entry may include the first question as a key value. The first entry may associate the first question with the first answer. In various examples, geolocation data associated with the first event and/or timestamp data associated with the first event may be stored in the first entry. If the generated first question matches a previously-stored question in the index, the first answer (and any associated data) may be used to update the entry associated with the previously-stored question (along with the timestamp), while retaining the older data.

Figure 7:
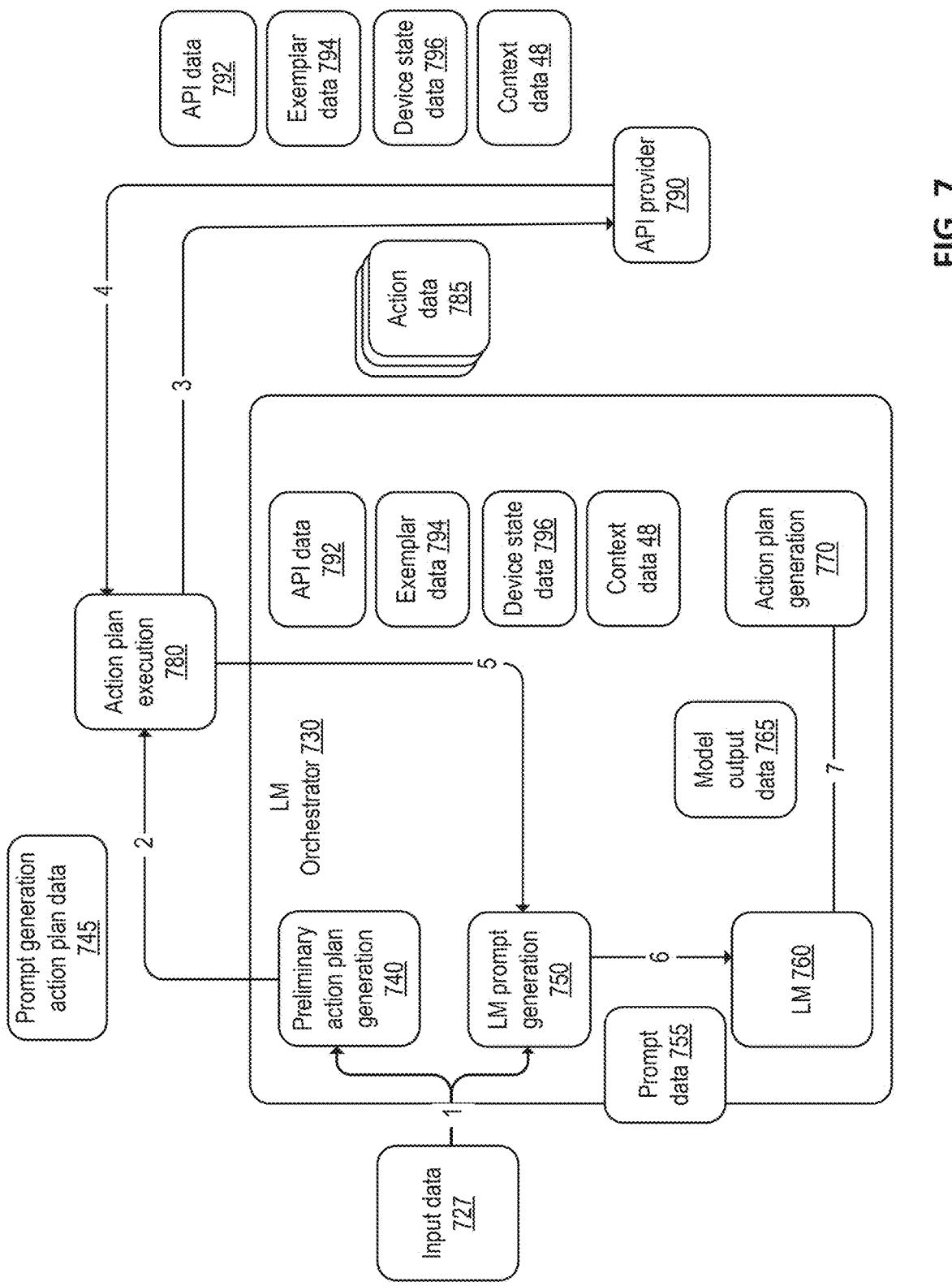
FIG. 7 depicts an example language model-based natural language processing flow, in accordance with various aspects of the present disclosure.

FIG. 7 depicts an example LM-based natural language processing flow (which may be an example LM architecture (e.g., of LM-Question Generation Agent 120 and/or LM-QA Agent 130), in accordance with various aspects of the present disclosure. The example architecture in FIG. 7 includes an LM orchestrator 730 and various other components for determining an action responsive to a user input and/or event stream input. The architecture may further include an action plan execution component 780 and an API provider component 790. With reference to FIG. 7, the LM orchestrator 730 may include a preliminary action plan generation component 740, a LM prompt generation component 750, an LM 760, and an action plan generation component 770. In various examples, the LM 760 (e.g., LM-Question Generation Agent 120 and/or LM-QA agent 130) may be a generative model.

In some examples, the LM 760 may be a transformer-based seq2seq model involving an encoder-decoder architecture. In some such embodiments, the LM 760 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the LM 760 may be pre-trained for approximately 1 trillion tokens. Being trained on CLM tasks, the LM 760 may be capable of in-context learning. An example of such a LM is Alexa Teacher Model (Alexa™).

In various examples, the input to the LM 760 may be in the form of a prompt. A prompt may be a natural language input, for example, an instruction, for the LM 760 to generate an output according to the prompt (e.g., one or more questions for input event data). The output generated by the LM 760 may be a natural language output responsive to the prompt. The prompt and the output may be text in a particular spoken language.

The LM 760 may be configured using various learning techniques. For example, in some embodiments, the LM 760 may be configured (e.g., "fine tuned") using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the LM 760 may be configured using one-shot learning, which is similar to few-shot learning, except the model is provided with a single example. As another example, in some embodiments, the LM 760 may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

The LM orchestrator 730 may be configured for generating the prompt to be used by the LM 760 to determine an action responsive to a user query and/or to input event data. As shown in FIG. 7, the LM orchestrator 730 receives (at step 1) input data 727 (which may be event data and/or a user query, as described above in reference to FIG. 1). In some instances, the input data 727 may correspond to a text or tokenized representation of a user input. For example, prior to the LM orchestrator 730 receiving the input data 727, another component (e.g., an ASR component) may receive audio data representing the input. The ASR component may perform ASR processing on the audio data to determine ASR output data corresponding to the user input. As previously described, an ASR component may determine ASR data that includes an ASR N-best list including multiple ASR hypotheses and corresponding confidence scores representing what the user may have said. The ASR hypotheses may include text data, token data, etc. as representing the input utterance. The confidence score of each ASR hypothesis may indicate the ASR component's level of confidence that the corresponding hypothesis represents what the user said. The ASR component may also determine token scores corresponding to each token/word of the ASR hypothesis, where the token score indicates the ASR component's level of confidence that the respective token/word was spoken by the user. The token scores may be identified as an entity score when the corresponding token relates to an entity. In some instances, the input data 727 may include a top scoring ASR hypothesis of the ASR data.

As illustrated in FIG. 7, the input data 727 may be received at the preliminary action plan generation component 740 and the LM prompt generation component 750 of the LM orchestrator 730. The preliminary action plan generation component 740 processes the input data 727 to generate prompt generation action plan data 745 corresponding to an instruction(s) (e.g., a request(s)) for one or more portions of data usable to generate a language model prompt for determining an action responsive to the user input). In some examples, the one or more portions of data may be data that is determined to be relevant for processing of the input. The one or more portions of data may represent one or more actions (e.g., API definitions), one or more exemplars corresponding to the actions (e.g., example model outputs including an appropriate use of the API), one or more device states corresponding to one or more devices associated with the user input, and/or one or more other contexts associated with the user input. For example, if the input data 727 represents an event related to a particular entity then the preliminary action plan generation component 740 may determine prompt generation action plan data 745 representing instructions for one or more actions (e.g., API definitions) related to retrieving information from a data store (e.g., knowledge graph 108) related to the entity.

In some examples, the prompt generation action plan data 745 may include one or more executable API calls usable for retrieving the one or more portions of data from the corresponding component. For example, instructions included in the prompt generation action plan data 745 may include "FETCH_API," "FETCH_EXEMPLAR," "FETCH_DE-VICE_STATE," "FETCH_CONTEXT," etc., along with optional API arguments/inputs. In some embodiments, the prompt generation action plan data 745 may also include the input data 727. The prompt generation action plan data 745 may be sent (at step 2) to the action plan execution component 780.

In some examples, the preliminary action plan generation component 740 may implement one or more machine learning (ML) models. A first ML model(s) may be configured to take as input the input data 727 and generate a representation of the user's request. For example, the preliminary action plan generation component 740 may include the event processor 102. For example, the ML model may be a text summarization model or a text rewrite model. A second ML model (or the first ML model) may be configured to take as input the input event data or query data and may determine one or more portions of data relevant for processing of the input. For example, the second ML model may be a classifier trained to classify the request (or the input data 727) to determine data (or types of data) relevant to the processing of the input (e.g., one or more related actions (e.g., API definitions), one or more exemplars corresponding to the one or more related actions, one or more device states corresponding to one or more related devices, one or more related contexts, etc.)

In other embodiments, the preliminary action plan generation component 740 may be an LM, similar to the LM 760. In such embodiments, the architecture may include a further component configured to generate a prompt to be provided to the LM (e.g., similar to the LM prompt generation component 750) or the prompt may be generated by the LM prompt generation component 750. In various examples, the LM prompt generation component 750 may use the various techniques described herein to generate the prompt. For example, the LM prompt generation component 750 may include natural language instructions and/or code configured to cause the LM 760 to explore multiple different strategies in a decision tree for the current input task. Additionally, using planning (e.g., CoT prompting) the LM prompt generation component 750 may generate a prompt to cause the LM 760 to divide the current task into multiple sub-tasks, with thoughts, actions, and observations. The LM may process the prompt and generate model output data representing the one or more portions of data (or types of data). The preliminary action plan generation component 740 may process the model output data to determine the prompt generation action plan data 745.

The action plan execution component 780 may process the prompt generation action plan data 745 to execute the one or more instructions to retrieve/receive data corresponding to the input and that may be used to generate the language model prompt. As shown in FIG. 7, the action plan execution component 780 processes the prompt generation action plan data 745 to generate action data 785 representing an action included in the prompt generation action plan data 745 (e.g., a single instruction, such as FETCH_CONTEXT).

For example, in the situation where the action is represented by an API call, the action data 785 may represent the action plan execution component 780 executing the API call included in the prompt generation action plan data 745. The action data 785 may be sent (at step 3) to the API provider component 790. In the situation where the prompt generation action plan data 745 includes more than one instruction, the action plan execution component 780 may generate more than one instance of action data 785 (e.g., one instance for each instruction included in the prompt generation action plan data 745) and send each instance to the API provider component 790.

The API provider component 790 may process the (one or more instances of the) action data 785 and cause the retrieval of the (one or more portions of) data associated with the action data 785. The API provider component 790 may include a knowledge provider component. The knowledge provider component may include an API retrieval component, an exemplar retrieval component, a device state retrieval component, and an "other" context retrieval component. The knowledge provider component may provide the action data 785 to the component(s) configured to determine the data corresponding to the request(s) represented by the action data 785.

For example, the API retrieval component (not shown) may process the action data 785 to generate API data 792 representing one or more APIs that correspond to an action performable with respect to the input. For example, if the user input corresponds to "turn on the kitchen light," the API retrieval component may determine an API usable to control a device and include an API definition corresponding to the API in the API data 792. In some embodiments, the API definition may include one or more API call frameworks for instructing/requesting that the API perform an action (e.g., turn_on_device (device: [device name]), turn_off_device (device: [device name]), set_device_temperature (device: [device name]); temperature: [temperature], set_device_volume (device: [device name]; volume: [volume value]), etc.). In some embodiments, the API definition may include a natural language description of the functionality of the API (e.g., a natural language description of the actions performable by the API/API call framework). For example, for the abovementioned API determined to be associated with the user input of "turn on the kitchen light," the API definition may further include a natural language description of "used to power on a device." In some embodiments, the one or more API definitions may be included in the API data 792 based on them being semantically similar to the user input. For example, the API retrieval component may be capable of comparing (e.g., using cosine similarity) (an encoded representation of) the user input to (an encoded representation of) the API definition to determine a semantic similarity between the user input and the API definition (e.g., a semantic similarity between the user input and the natural language description of the functionality of the API included in the API definition). If the API definition is determined to be semantically similar to the user input, then the corresponding API definition may be included in the API data 792. In some embodiments, the API retrieval component may include the top-n identified API definitions in the API data 792. The API data 792 may be sent (at step 4) to the action plan execution component 780 as shown in FIG. 7.

For further example, the exemplar retrieval component may process the action data 785 to generate exemplar data 794 representing one or more exemplars associated with one or more APIs (e.g., the API represented by the API data 792). As used herein, an "exemplar" associated with an API corresponds to an example use of the API (e.g., an example language model output including use of the API (e.g., via a corresponding API call) with respect to a user input, where the user input is similar to the current user input. For example, for an API associated with the API call framework "turn_on_device (device: [device name])," and the current user input "please turn on the kitchen lights" the exemplar retrieval component may select an exemplar including the example user input of "please turn on the lights" and the API call of "turn_on_device (device="lights")." In some embodiments, an exemplar represented in the exemplar data 794 may include an example user input, a natural language description of an action associated with the example user input, an executable API call associated with the example user input and the action associated with the example user input, an example result of the API call, a natural language description of an action to be performed in response to the example result of the API call, and/or an output responsive to the user input. For example, for an API associated with the API call frameworks "Routine.create_turn_on_action(device: str)" and "Routine.create_time_trigger(hour: [hour value])" and the current user input "please turn on the kitchen light everyday at 7 am," the exemplar retrieval component may select an exemplar related to creating a routine for device control.

Although not illustrated in FIG. 7, in some embodiments, the API provider component 790 and/or a knowledge provider component may provide the exemplar retrieval component with the action data 785 and a list of API call(s) to which the determined exemplars are to be associated (e.g., the API call(s) included in the API data 792). In some embodiments, the one or more exemplars may be included in the exemplar data 794 based on them being semantically similar to the user input. For example, the exemplar retrieval component may be capable of comparing (e.g., using cosine similarity) the current user input to the example user input included in an exemplar to determine a semantic similarity between the current user input and the example user input. If the example user input is determined to be semantically similar to the current user input, then the corresponding exemplar may be included in the exemplar data 794. In some embodiments, the exemplar retrieval component may include the top-n identified exemplars in the exemplar data 794. The exemplar data 794 may be sent (at step 4) to the action plan execution component 780 as shown in FIG. 7.

As another example, a device state retrieval component (not shown in FIG. 7) may process the action data 785 to generate device state data 796 representing one or more states of one or more devices associated with/relevant to the user input (e.g., whether the device is powered on or off, a volume level associated with the device, etc.). For example, if the user input corresponds to "Please turn on the kitchen light," the device state data 796 may represent the state(s) of one or more devices that are associated with a functionality of turning on a light, are associated with the kitchen, are associated with a user profile of a user who provided the user input, etc. In some embodiments, the device(s) may be determined to be relevant based on a device location(s). For example, devices (e.g., microwave, oven, fridge, smart speaker, etc.) near the user device (e.g., located in the kitchen) that received the user input may be used to determine the device state data 796. In some embodiments, the one or more devices may be determined to be relevant to the user input based on device profile information. For example, the device state retrieval component may be capable of comparing device profile information for a device (e.g., device ID, device group ID, a location associated with the device, etc.) to the user input to determine whether the device is relevant to the user input. In some embodiments, the device state retrieval component may include the top-n identified device states in the device state data 796. The device state data 796 may be sent (at step 4) to the action plan execution component 780 as shown in FIG. 7.

As a further example, a context retrieval component (not shown) may process the action data 785 to generate other context data 48 (apart from the device state data 796, the API data 792, the exemplar data 794, etc.) representing one or more contexts associated with/relevant to the user input. For example, the other context data 48 may represent user profile information (age, gender, associated devices, user preferences, etc.), visual context (e.g., content being displayed by devices associated with the user profile, content being displayed by the user device that captured the user input, etc.), knowledge context (e.g., one or more previous user inputs and/or system generated responses, etc.), time of day, geographic/device location, weather information, etc. In some embodiments, the context data 48 may include the top-n identified context. The other context data 48 may be sent (at step 4) to the action plan execution component 780 as shown in FIG. 7.

In some embodiments, the knowledge provider component may be configured to cause one or more of the API retrieval component, the exemplar retrieval component, the device state retrieval component, and the other context retrieval component to process based on the data output by one or more of the components of the knowledge provider component. For example, if the output of the API retrieval component (e.g., the API data 792) indicates that a related API definition was identified, then the knowledge provider component (or another component) may cause the exemplar retrieval component to process to determine one or more exemplars related to the identified API definitions. For further example, if the output of the API retrieval component (e.g., the API data 792) indicates that a particular API definition was identified (e.g., an API definition for controlling a device), then the knowledge provider component may cause the exemplar retrieval component to process as described above, and may further cause the device state retrieval component and/or the other context retrieval component to process to determine device states for one or more related devices and/or other contextual information based on the identified API definition being associated with controlling a device. In some embodiments, the knowledge provider component may determine to cause the components to process based on instruction(s) included in the action data (e.g., based on a determination made by preliminary action plan generation component 740, as discussed above).

The action plan execution component 780 may send (step 5) the data received from the API provider component 790 (e.g., the API data 792, the exemplar data 794, the device state data 796, and the other context data 48) to the LM prompt generation component 750. The LM prompt generation component 750 may be configured to generate prompt data 755 (e.g., using the input data 727, the API data 792, the exemplar data 794, the device state data 796, and/or the other context data 48) to be used by the LM 760.

In some examples, the LM prompt generation component 750 may generate the prompt data 755 representing a prompt for input to the LM 760. In some embodiments, such prompt data 755 may be generated based on combining the input data 727, the API data 792, the exemplar data 794, the device state data 796, and the other context data 48. The prompt data 755 may be an instruction to determine an action(s) responsive to the input data 727 given the other information (e.g., the API data 792, the exemplar data 794, the device state data 796, the other context data 48) included in the prompt data 755. In some embodiments, the LM prompt generation component 750 may also include in the prompt data 755 a sample processing format to be used by the LM 760 when processing the prompt and generating the response. In some embodiments, the prompt data 755 may be generated according to a template format. For example, the generated questions and answers depicted in FIGS. 2-3 may be formatted according to the template format.

In some examples, the template format may instruct the LM 760 as to how it should process to determine the action responsive to the user input and/or how it should generate the output including the action response to the user input. For example, as shown in the example above, the format may include the label "User:" labelling the following string of characters/tokens as the user input. For further example, the format may include the label "Thought:" instructing the LM 760 to generate an output representing the determined interpretation of the user input by the LM 760 (e.g., the user is requesting [intent of the user input], the user is trying to [intent of the user Input], etc.) As another example, the format may include the label "Observation:" labeling the following string of characters/tokens as the result of performance of an action determined by the LM 760/the LM 760's interpretation of the result of the performance of the action determined by the LM 760. As a further example, the format may include a label of "Response:" instructing the LM 760 to generate a response (e.g., a natural language output for a user) to the prompt.

In some embodiments, the LM prompt generation component 750 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy." The LM prompt generation component 750 may be configured to provide prompts to enable the self-inspired reasoning described herein. For example, the LM prompt generation component 750 may generate prompts instructing the LM 760 to consider several alternative approaches and/or lines of reasoning in order to respond to the input data 727. Additionally, the prompt generation component 750 may be configured to generate prompts causing the LM 760 to backtrack after generating intermediate output to consider other branches of reasoning and may also instruct the LM 760 to aggregate information from different lines of reasoning prior to the next planning step.

The LM 760 processes the prompt data 755 to generate model output data 765 representing an action responsive to the user input. For example, based on processing the example prompt data provided above, the LM 760 may output model output data 765: {"Thought: the user is trying to turn on the living room light; Action: turn_on_device (device="living room light")," } or the like. The model output data 765 is sent (at step 7) to the action plan generation component 770. The action plan generation component 770 may parse the model output data 765 to determine action plan data representing the action generated by the LM 760. For example, for the model output data 765: "Action: turn_on_device (device="living room light")," the corresponding action plan data may correspond to "turn_on_device (device="living room light")" (e.g., corresponding to the action generated by the LM 760, without the label of "Action"). In some embodiments, the action plan generation component 770 may determine an API call corresponding to the "Action" data included in the model output data 765. For example, in some embodiments, the action plan generation component 770 may fill in the arguments/inputs, if any, for the API call, which may be included in the action plan data. For further example, in some embodiments, the action plan execution component 780 may fill in the arguments/inputs, if any, for the API call.

FIG. 8 depicts an example of multi-modal content that may be retrieved using the system for event-triggered question generation and question-based retrieval of FIG. 1, in accordance with various aspects of the present disclosure. FIG. 8 depicts an example multimodal search result object 828 rendered on a user interface associated with a device, according to various examples of the present disclosure. As illustrated, the multimodal search result object 828 is associated with a particular multimodal fragment modality type (e.g., retrieved from hybrid QA database 124 (and/or from other sources), where the particular multimodal fragment modality type correlates to a first relevant multimodal fragment 830 configured as a visual graphic (e.g., animated graphic, infographic, static graphic) associated with an electronic data object associated with the current score of a sporting event. As described herein, LM-QA Agent 130 may generate a respective multimodal search result object (e.g., multimodal search result object 828) based on a preferred multimodal fragment modality type of the user, where the preferred multimodal fragment modality type is determined based at least in part on a query formulation associated with an input search query.

For example, the multimodal fragment sequence correlating to the multimodal search result object 828 may be a preferred multimodal fragment sequence associated with a query formulation such as "What is the score of the Dogs and Cats game?". In such an example, the LM-QA Agent 130 may generate a simple, easy-to-read infographic, visual graphic, and/or the like comprising only the pertinent information (e.g., current score, time remaining in a match, team possession of the sports ball, and/or the like) when inquiring about live sporting events.

As shown, in some examples, the first relevant multimodal fragment 830 configured as the visual graphic illustrating various pertinent information related to the sporting event may be interactive (e.g., selectable, expandable, searchable, configurable (e.g., to hide specific information), and/or the like). As such, if the user desires additional information beyond the pertinent information of the live sporting event, the user may engage the visual graphic to access more information, external links, and/or multimedia (e.g., video clips) related to the live sporting event. Additionally or alternatively, as shown, the multimodal search result object 828 may comprise a second relevant multimodal fragment 832 configured as an audio file, where the audio file may comprise audio data pertaining to the pertinent information of the live sporting event that plays automatically once the device renders the multimodal search result object 828.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:
receiving, using an asynchronous event driven architecture, a first event stream comprising a plurality of event messages;
determining first event message data of the plurality of event messages, the first event message data describing a first event of the first event stream;
retrieving past event data by performing a first semantic search using the first event message data as a first query to query a first data structure;
determining past question data and past answer data associated with the past event data in the first data structure;
inputting first prompt data into a language model, the first prompt data comprising the first event message data, the past event data, the past question data, the past answer data, and an instruction to generate a new question that is answerable using the first event message data;
generating, by the language model in response to the first prompt data, the new question and a new answer for the new question using the new question and the first event message data; and
generating an entry in a first search index comprising the new question, the new answer, and a first timestamp, wherein the new question is a key value in the first search index, and wherein the first timestamp identifies a time associated with the first event message data.

2. The computer-implemented method of claim 1, further comprising:
receiving a first query from a first device associated with a first account;
determining that the first query matches the new question key value in the first search index;
determining, using the first timestamp, that the new answer in the first search index is a most recent answer associated with the new question; and
sending data representing the new answer to the first device in response to the first query.

3. The computer-implemented method of claim 1, further comprising:
determining that the first event message data lacks image content;
performing a second semantic search of a multi-modal data structure using the first event message data;
determining that no results are retrieved from the second semantic search;
generating a missing content event;
receiving, in response to the missing content event, first image data relevant to the first event message data; and
storing the first image data in association with the key value.

4. A computer-implemented method comprising:
receiving, by a first computing device from an asynchronous interface, first event data from an event stream;
generating a first prompt for a first language model, the first prompt comprising the first event data and a first request to generate at least a first question associated with the first event data;
generating, by the first language model based at least in part on the first prompt, the first question and a first answer to the first question; and
generating a first entry for a search index, the first entry comprising the first question as a key value, wherein the first entry associates the first question with the first answer.

5. The computer-implemented method of claim 4, further comprising:

receiving, by the first computing device from a second computing device, first query data comprising a second question;

identifying the first entry in the search index based at least in part on a correspondence between the second question and the first question; and retrieving, from the search index, the first answer to the first question.

6. The computer-implemented method of claim 4, further comprising:

receiving, by a second language model, first query data comprising a second question;

identifying a set of questions in the search index based at least in part on a first semantic search of the search index using the first query data;

determining, for each question of the set of questions, a respective answer stored in the search index;

sending, to the second language model, the set of questions and the respective answer for each question of the set of questions; and generating, by the second language model, a response to the second question based at least in part on the set of questions and the respective answer for each question of the set of questions.

7. The computer-implemented method of claim 4, further comprising:

receiving, by the first computing device, second event data from the event stream;

generating a second prompt for the first language model, the second prompt comprising the second event data and a second request to generate at least a second question associated with the second event data;

generating, by the first language model based at least in part on the second prompt, the second question and a second answer to the second question;

determining, by the first language model, that the second question corresponds to the first question; and generating an updated first entry for the search index based at least in part by storing the second answer in association with the key value, wherein a timestamp associated with the second answer indicates that the second answer is a more temporally recent answer to the first question than the first answer.

8. The computer-implemented method of claim 4, further comprising:

determining, for the first event data, past event data based on a semantic search of a past event database using the first event data;

determining, for the past event data, a past question and a past answer associated with the past event data; and sending the past event data, the past question, and the past answer to the first language model, wherein the generating, by the first language model, the first question and the first answer to the first question is further based at least in part on the past event data, the past question, and the past answer.

9. The computer-implemented method of claim 8, wherein the past question and the past answer were generated by the first language model based on receipt of the past event data.

10. The computer-implemented method of claim 4, further comprising:

searching, using a second question generated by the first language model and the first event data, at least one database for applicable image data;

determining that no image data that is permissible for use is available in the at least one database;

generating first data representing a missing content request; and storing the first data in a first memory.

11. The computer-implemented method of claim 10, further comprising:

determining that first image data associated with the first event data has become available; and generating an updated entry in the search index by adding identifier data associated with the first image data to the first entry.

12. The computer-implemented method of claim 4, further comprising:

receiving first query data comprising a second question;

determining, by a second language model using the first query data, a set of questions stored in the search index that are similar to the second question;

determining, for each question of the set of questions, a respective answer and a respective timestamp associated with the respective answer; and generating, by the second language model, a response to the first query data based at least in part on the respective answers and the respective timestamps.

13. A system comprising:

at least one processor; and non-transitory computer-readable memory storing instructions that, when executed by the at least one processor, are effective to:

receive, by a first computing device from an asynchronous interface, first event data from an event stream;

generate a first prompt for a first language model, the first prompt comprising the first event data and a first request to generate at least a first question associated with the first event data;

generate, by the first language model based at least in part on the first prompt, the first question and a first answer to the first question; and generate a first entry for a search index, the first entry comprising the first question as a key value, wherein the first entry associates the first question with the first answer.

14. The system of claim 13, the non-transitory computer-readable memory storing further instructions that, when executed by the at least one processor, are further effective to:

receive, by the first computing device from a second computing device, first query data comprising a second question;

identify the first entry in the search index based at least in part on a correspondence between the second question and the first question; and retrieve, from the search index, the first answer to the first question.

15. The system of claim 13, the non-transitory computer-readable memory storing further instructions that, when executed by the at least one processor, are further effective to:

receive, by a second language model, first query data comprising a second question;

identify a set of questions in the search index based at least in part on a first semantic search of the search index using the first query data;

determine, for each question of the set of questions, a respective answer stored in the search index;

send, to the second language model, the set of questions and the respective answer for each question of the set of questions; and generate, by the second language model, a response to the second question based at least in part on the set of questions and the respective answer for each question of the set of questions.

16. The system of claim 13, the non-transitory computer-readable memory storing further instructions that, when executed by the at least one processor, are further effective to:

receive, by the first computing device, second event data from the event stream;

generate a second prompt for the first language model, the second prompt comprising the second event data and a second request to generate at least a second question associated with the second event data;

generate, by the first language model based at least in part on the second prompt, the second question and a second answer to the second question;

determine, by the first language model, that the second question corresponds to the first question; and generate an updated first entry for the search index based at least in part by storing the second answer in association with the key value, wherein a timestamp associated with the second answer indicates that the second answer is a more temporally recent answer to the first question than the first answer.

17. The system of claim 13, the non-transitory computer-readable memory storing further instructions that, when executed by the at least one processor, are further effective to:

determine, for the first event data, past event data based on a semantic search of a past event database using the first event data;

determine, for the past event data, a past question and a past answer associated with the past event data; and send the past event data, the past question, and the past answer to the first language model, wherein the generating, by the first language model, the first question and the first answer to the first question is further based at least in part on the past event data, the past question, and the past answer.

18. The system of claim 17, wherein the past question and the past answer were generated by the first language model based on receipt of the past event data.

19. The system of claim 13, the non-transitory computer-readable memory storing further instructions that, when executed by the at least one processor, are further effective to:

search, using a second question generated by the first language model and the first event data, at least one database for applicable image data;

determine that no image data that is permissible for use is available in the at least one database;

generate first data representing a missing content request; and store the first data in the non-transitory computer-readable memory.

20. The system of claim 19, the non-transitory computer-readable memory storing further instructions that, when executed by the at least one processor, are further effective to:

determine that first image data associated with the first event data has become available; and generate an updated entry in the search index by adding identifier data associated with the first image data to the first entry.

\* \* \* \* \*